No. 652,059. Patented June 19, 1900.
C. WAECHTER, Jr.
TOOL FOR TIGHTENING RUBBER TIRES.
(Application filed Mar. 7, 1900.)
(No Model.)
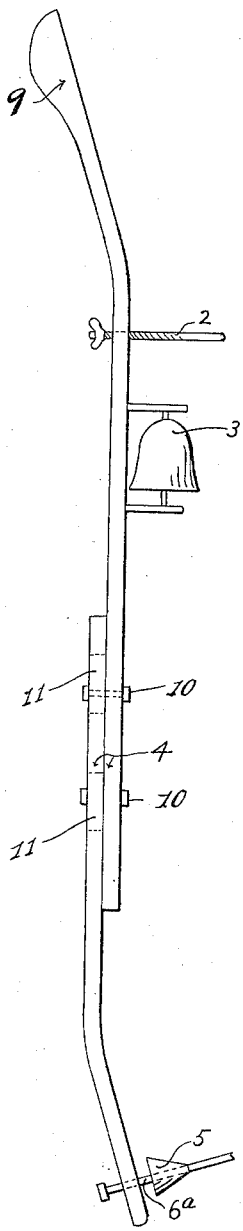
FIGURE - 2
Ralph S. Warfield
Geo. P. Hamlin
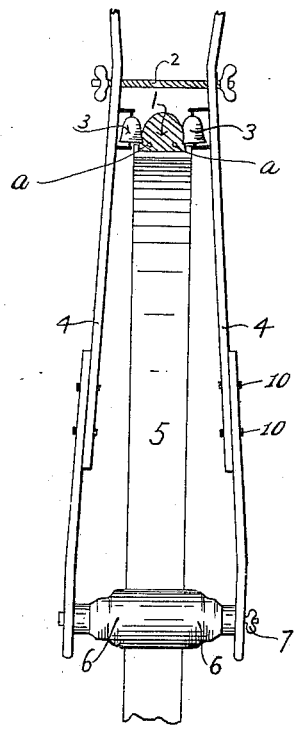
FIGURE - I
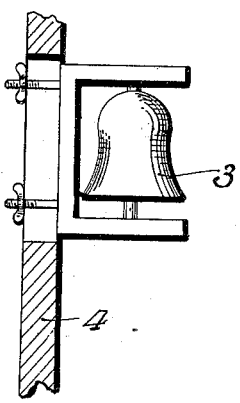
FIGURE - 3
Conrad Waechter Jr.
by Vernon C. Hodges
his Attorney

UNITED STATES PATENT OFFICE.

CONRAD WAECHTER, JR., OF MOUNT VERNON, NEW YORK.

TOOL FOR TIGHTENING RUBBER TIRES.

SPECIFICATION forming part of Letters Patent No. 652,059, dated June 19, 1900.

Application filed March 7, 1900. Serial No. 7,663. (No model.)

*To all whom it may concern:*

Be it known that I, CONRAD WAECHTER, Jr., a citizen of the United States of America, residing at Mount Vernon, in the county of Westchester and State of New York, have invented a certain new and useful Improvement in Tools for Tightening Rubber Tires, of which the following is a specification.

My invention relates to an improvement in tools for tightening rubber tires.

It is customary in the art of securing rubber tires upon the channel-iron rim of vehicle-wheels where one or more wires are employed to hold the rubber tire upon the rim to force the rubber back as far as possible from the ends of the wire or wires while the latter are being electrically welded or otherwise secured together.

The object of my present invention is to provide means for stretching the rubber tire uniformly after it has been pushed back at its ends to bring the ends together in proper position; and my invention consists in certain novel features of construction and combinations of parts for bringing about this purpose, which will be hereinafter fully described, and pointed out in the claims.

In the accompanying drawings, Figure 1 is a view showing my improved device in position to force the rubber tire into place. Fig. 2 is an enlarged detail of one of the members, and Fig. 3 is a view of a modification.

The numeral 1 indicates the solid-rubber tire. This rubber tire has one or more holes *a a* for the passage of the wires (not shown) for fastening the tire in position upon the channel-iron wheel-rim 5.

Numerals 4 4 indicate clamping-levers. As shown in Figs. 1 and 2, these clamping-levers are made in two pieces, held together by bolts 10 10. The latter pass through holes in one bar and elongated slots 11 11 in the other, the object of which construction is to provide for lengthening and shortening the clamping-levers. The lower ends of these clamping-levers are pivotally connected with hub 6 by means of a rod or bolt 6ª and cones 5 5, which extend into and through said hub, thus affording a pivotal support for the clamping-lever when in operation. A thumb-nut 7 holds the lever on the bolt 6ª, as shown in Fig. 1 of the drawings.

On the clamping-levers 4 4 are secured the gripping-jaws 3 3. These are perfectly rigid, and may be round or half-round or of other convenient shape, although in contour their inner edges are preferably bell-shaped, as shown in Figs. 1 and 2, the object of which construction is to afford a better and more secure grip upon the rubber tire and more particularly to have a tendency to slightly raise the tire from the channel-iron while the latter is being pulled and stretched. The outer ends of the clamping-levers terminate in handles 9 9, and the connecting-screw or bolt 2 is used for drawing and securing said clamping-levers tightly together, so that the gripping-jaws 3 3 will hold fast to the interposed rubber tire. The gripping may be effected by hand-pressure entirely—that is to say, by merely pressing the levers tightly together by gripping upon them with the hand, although this bolt or screw is provided for locking it or applying additional pressure to it, if required.

In the modification shown in Fig. 3 means is provided for raising or lowering the gripping-jaws instead of lengthening and shortening the gripping-levers, as is provided in the construction shown in Figs. 1 and 2. The purpose of the adjustment of course is perfectly obvious, it being to regulate the position of the gripping-jaws with respect to the rubber tire to be pulled and stretched. Of course this adjustment is necessary for the reason that the tool is adapted to operate on various sizes of wheels, as the case may be.

While in operation it is possible to clamp one end of the rubber tire, as has been usually done in the old method, where the tire has been stretched back into position by means of a wooden mallet, yet it is my purpose, if desired, to stretch from either one or both ends of the rubber tire and when from both ends the mechanism is duplicated, for in lieu of two clamping-levers four would be employed, two to engage one end of the rubber tire and the other two the other end. This is a decided improvement on the old method of forcing the ends of the rubber tire together by pounding upon them with a mallet, and it has the advantages of being simple, composed of few parts, and easy to operate and manipulate.

It is evident that slight changes might be resorted to in the form and arrangement of the several parts described in addition to those specified without departing from the spirit and scope of my invention, and hence I do not wish to limit myself to the precise construction shown; but, Having fully described my invention, what I claim as new, and desire to secure by Letters Patent, is—

1. A tool for tightening rubber tires consisting in a pair of clamping-levers each of which is provided with a gripping-jaw adapted to embrace the rubber tire from opposite positions, said levers pivoted concentric with the hub of the wheel and means for adjusting the position of the gripping-jaws.

2. A tool for tightening rubber tires consisting in a pair of clamping-levers, each of which is provided with a gripping-jaw adapted to embrace the rubber tire from opposite positions, said levers pivoted concentric with the hub of the wheel, means for adjusting the position of the gripping-jaws and means for locking the levers together.

3. A tool for tightening rubber tires consisting in a pair of gripping-levers, each of which carries a gripping-jaw, the gripping-face of which is bell-shaped, whereby to have a lifting as well as a gripping tendency upon the rubber tires when the levers are forced together.

4. A tool for tightening rubber tires consisting in a pair of gripping-levers, each of which carries a gripping-jaw, the gripping-face of which is bell-shaped, whereby to have a lifting as well as a gripping tendency upon the rubber tires when the levers are forced together and means for regulating and varying the distance of the gripping-jaws from the pivot.

5. A tool for tightening rubber tires consisting of extensible gripping-levers having gripping-jaws thereon and means for securing the jaws pivotally to the hub of the vehicle-wheel.

In testimony whereof I have signed my name to this specification in the presence of two subscribing witnesses.

CONRAD WAECHTER, JR.

Witnesses:
 Z. A. CLOSE,
 ROBERT B. CAMPBELL.